United States Patent
Frey et al.

(10) Patent No.: US 11,680,209 B1
(45) Date of Patent: Jun. 20, 2023

(54) PROCESS FOR CONVERTING PLASTIC FEED CONTAINING POLYPROPYLENE TO AROMATICS

(71) Applicant: UOP LLC, Des Plaines, IL (US)

(72) Inventors: Stanley Joseph Frey, Palatine, IL (US); Ping Sun, Hinsdale, IL (US)

(73) Assignee: UOP LLC

( * ) Notice: Subject to any disclaimer, the term of this patent is extended or adjusted under 35 U.S.C. 154(b) by 0 days.

(21) Appl. No.: 17/548,719

(22) Filed: Dec. 13, 2021

(51) Int. Cl.
| | |
|---|---|
| C10G 1/10 | (2006.01) |
| B01D 3/14 | (2006.01) |
| C07C 6/12 | (2006.01) |
| C07C 5/22 | (2006.01) |
| C10G 1/00 | (2006.01) |
| B01J 19/24 | (2006.01) |
| C10B 53/07 | (2006.01) |

(52) U.S. Cl.
CPC .......... C10G 1/10 (2013.01); B01D 3/14 (2013.01); B01J 19/245 (2013.01); C10B 53/07 (2013.01); C10G 1/002 (2013.01); *B01J 2219/0004* (2013.01); *C10G 2300/1003* (2013.01); *C10G 2400/30* (2013.01)

(58) Field of Classification Search
None
See application file for complete search history.

(56) References Cited

U.S. PATENT DOCUMENTS

| | | | |
|---|---|---|---|
| 2012/0130712 | A1 | 5/2012 | Shin |
| 2012/0149958 | A1 | 6/2012 | Ellrich et al. |
| 2020/0017773 | A1* | 1/2020 | Ramamurthy ......... C10G 35/00 |
| 2020/0115302 | A1* | 4/2020 | Xu ........................ C07C 5/277 |
| 2021/0323894 | A1 | 10/2021 | Housmans |

OTHER PUBLICATIONS

Dadi V. Suriapparao, "Effective deoxygenation for the production of liquid biofuels via microwave assisted co-pyrolysis of agro residues and waste plastics combined with catalytic upgradation", Jan. 10, 2020.
Search Report and Written Opinion for PCT/US2022/081176 dated Apr. 17, 2023.

* cited by examiner

*Primary Examiner* — Philip Y Louie
(74) *Attorney, Agent, or Firm* — Paschall & Associates, LLC; James C. Paschall

(57) ABSTRACT

A process is provided for utilizing polypropylene-containing waste plastic. The process provides pyrolyzing a plastic feed in a pyrolysis reactor to obtain a pyrolysis effluent stream. The process further provides passing the pyrolysis effluent stream to a distillation column to obtain a $C_9$ hydrocarbons rich stream which is also dimethylheptenes rich and then passing the $C_9$ hydrocarbons rich stream to a reforming unit to provide a reformate stream. The process further provides passing the reformate stream to a transalkylation unit to provide a mixed-xylenes stream.

15 Claims, 1 Drawing Sheet

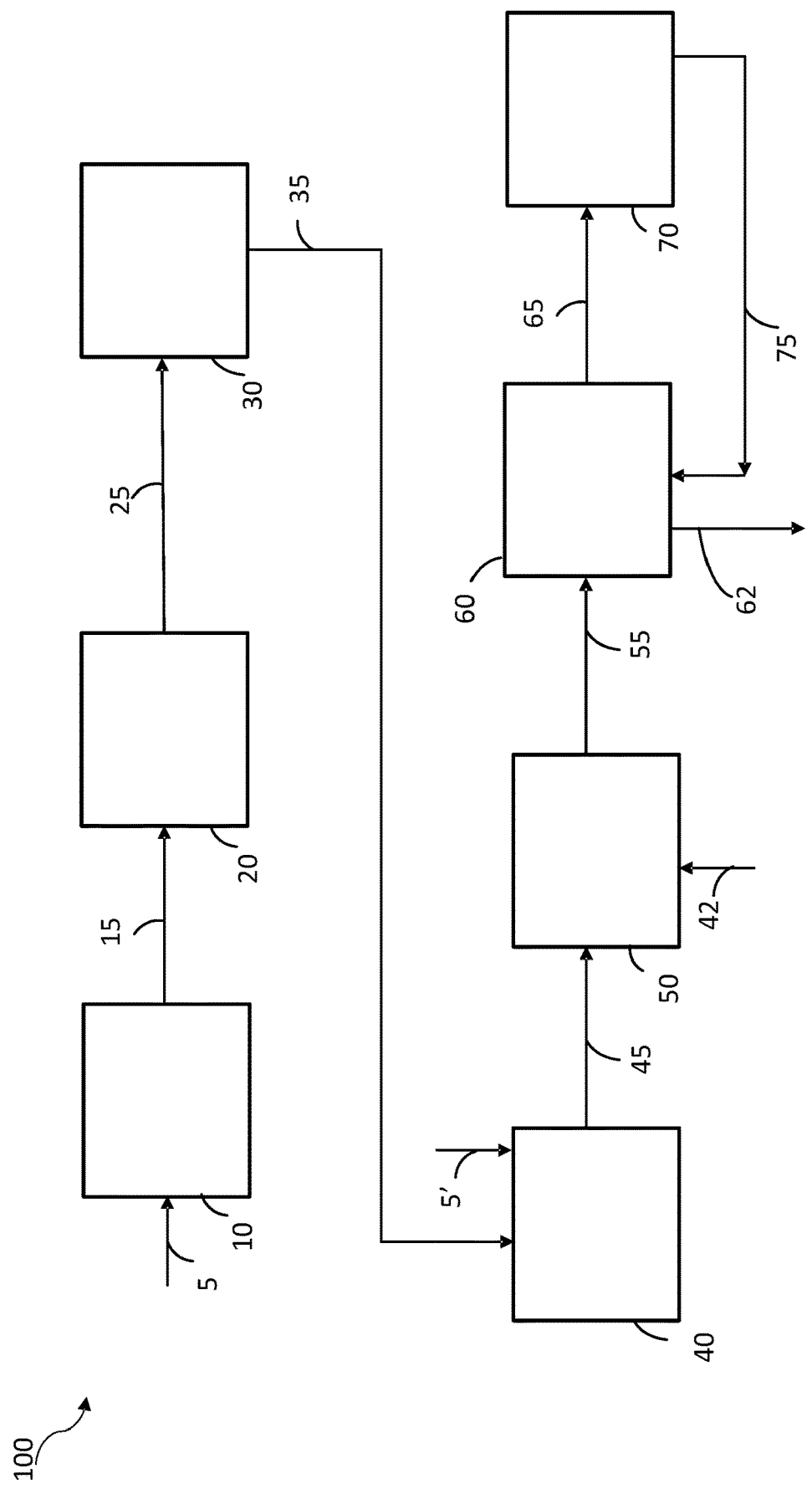

US 11,680,209 B1

PROCESS FOR CONVERTING PLASTIC FEED CONTAINING POLYPROPYLENE TO AROMATICS

FIELD

The field relates to a process for converting plastic feed to aromatics. More particularly the field relates to a process for converting polypropylene-containing waste plastic feed into highly branched aliphatic molecules by pyrolysis and then converting these aliphatic molecules into aromatics.

BACKGROUND

A paradigm shift has enabled the chemical industry to rapidly respond with new chemical recycling processes for recycling waste plastics. The new paradigm is to chemically convert the recyclable plastics in a pyrolysis process. The pyrolysis of waste plastic results in the generation of a mixture of hydrocarbons. A key to best valorizing these pyrolysis liquids is finding ways that best leverage the molecular structure to make it useful for other chemical processes. Otherwise, the unique properties of these streams are not leveraged, and their value degrades to that of cuts of crude petroleum.

Therefore, there is a need to rethink of ways to utilize these mixtures of hydrocarbons obtained from waste plastics pyrolysis.

SUMMARY OF INVENTION

Applicants have discovered a process for utilizing polypropylene-containing waste plastic. The process provides pyrolyzing a plastic feed in a pyrolysis reactor to obtain a pyrolysis effluent stream. The process further provides passing the pyrolysis effluent stream to a distillation column to obtain a $C_9$ hydrocarbons rich stream which is also dimethylheptenes rich and then passing the $C_9$ hydrocarbons rich stream to a reforming unit to provide a reformate stream. The process further provides passing the reformate stream to a transalkylation unit to provide a mixed-xylenes stream.

These and other features, aspects, and advantages of the present disclosure are further explained by the following detailed description, drawing and appended claims.

BRIEF DESCRIPTION OF THE DRAWINGS

The various embodiments will hereinafter be described in conjunction with the Figure, wherein like numerals denote like elements. The FIGURE is a schematic drawing of a process and apparatus of the present disclosure.

Skilled artisans will appreciate that elements in the Figure are illustrated for simplicity and clarity and have not necessarily been drawn to scale. For example, the dimensions of some of the elements in the Figure may be exaggerated relative to other elements to help to improve understanding of various embodiments of the present disclosure. Also, common but well-understood elements that are useful or necessary in a commercially feasible embodiment may not be depicted to facilitate a less obstructed view of these various embodiments of the present disclosure.

Definitions

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1, C_2, C_3 \ldots C_n$ where "n" represents the number of carbon atoms in the one or more hydrocarbon molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" can refer to an area including one or more equipment items and/or one or more units. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "weight percent" may be abbreviated "wt. %" and unless otherwise specified the notation "%" refers to "wt. %"".

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottom stream back to the bottom of the column. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column.

As used herein, the term "predominant" or "predominate" means greater than 50%, suitably greater than 75% and preferably greater than 90%.

As used herein, the term "a component rich stream" means that the rich stream coming out of a vessel has a greater concentration of the component than the feed to the vessel.

As used herein, the term "mixed plastic feed" means two or more polymers are present in the feed.

As used herein, the term "hour" may be abbreviated "hr.", the term "kilopascal" may be abbreviated "kPa", the term "megapascal" may be abbreviated "MPa", and the terms "degrees Celsius" may be abbreviated "° C.".

DETAILED DESCRIPTION

Applicants have disclosed a process for utilizing polypropylene-containing waste plastic feed. Applicants have discovered a process for converting a polypropylene-containing waste plastic feed into hydrocarbon products such as aromatics. The process provides pyrolyzing a plastic feed in a pyrolysis reactor to obtain a pyrolysis effluent stream. The process further provides passing the pyrolysis effluent stream to a distillation column to obtain a $C_9$ hydrocarbons rich stream, that is rich in dimethylheptenes, and then passing the $C_9$ hydrocarbons rich stream to a reforming unit to provide a reformate stream. The process further provides passing the reformate stream to a transalkylation unit to provide a mixed-xylenes stream.

An example of an integrated arrangement 100 to produce aromatics from waste plastic feed is shown in the Figure which includes a pyrolysis reactor 10, a distillation column 20, a reforming unit 40, a transalkylation unit 50, a para-xylene extraction column 60, and a xylene isomerization unit 70.

A plastic feed stream in a plastic feed line 5 may be obtained from a materials recycling facility (MRF) that is otherwise sent to a landfill or an incinerator for partial energy recovery. The plastic feed stream is used as feedstock for the pyrolysis reactor. The plastic feed is a mixed plastic feed comprising polyolefins such as polyethylene and polypropylene. The plastic feed may contain about 40 to about 100 wt % polypropylene. Any type of polyolefin plastic is acceptable even if mixed with other monomers randomly or as a block copolymer. Hence, a wider range of plastics may be recycled according to this process. The plastics feed can be mixed polyolefins such as polyethylene, polypropylene, and polybutylene. Additionally, other polymers can be mixed with the polyolefin plastics or provided as feed by itself. Other polymers that can be used by itself or with other polymers include polyethylene terephthalate, polyvinyl chloride, polystyrene, polyamides, acrylonitrile butadiene styrene, polyurethane, and polysulfone. Many different plastics can be used in the feed because the process pyrolyzes the plastic feed to smaller molecules including light olefins. The plastic feed stream may contain non-plastic impurities such as paper, wood, aluminum foil, some metallic conductive fillers or halogenated or nonhalogenated flame retardants.

The mixed plastic feed consists of non-plastic contaminants. These non-plastic contaminants contribute to production of a carbon-rich, hydrogen-deficient residue, and may result in operational difficulties in the pyrolysis process. Thus, a pretreatment process may be designed to eliminate non-plastic contaminants as much as possible. Among the non-plastic contaminants, paper and cardboard are commonly removed using an air separation technique which uses a stream of rapidly moving air to eject such contaminants from the passing waste stream. Ferrous metals are taken out by magnet, and non-ferrous metal, such as aluminum cans, can be taken out by electrical current force through an eddy current device.

For further sorting of plastic waste, modern sorting technology has advanced to a level that targeted selection or rejection may be achieved through "fingerprint" sorters designed to identify individual polymer types and sort them accordingly. Near infrared sortation detects polymer type at the plastic surface and positively picks or negatively rejects using compressed air jets to lift plastics off a conveyer belt. Electromagnetic and robot sortation is used for more advanced sorting. There are also sorting techniques that mainly target PET, such as manual processes that use ultraviolet light that shows PET as appearing blue while PVC items will be yellow or green when exposed to UV light. It is important to remove PET because oxygenates formed from PET pyrolysis have low value, cause operational issues in the pyrolysis process, and cause the product pyrolysis oil to have weaker acidity than desired. Bulk PVC is removed from sorting step.

A sorted, plastics rich stream may be pyrolyzed in the pyrolysis reactor 10 operating under pyrolysis conditions. Plastics pyrolysis reactions are endothermic, so all reaction heat must be provided by a burner, an exchanger or a heat-integrated process flow that provides heat input. The pyrolysis reactor 10 may operate at a temperature from about 300° C. (572° F.) to about 550° C. (1022° F.), or preferably about 380° C. (716° F.) to about 450° C. (842° F.), a pressure from about 0.034 MPa (gauge) (5 psig) to about 1.034 MPa (gauge) (150 psig), or preferably about 0.138 MPa (gauge) (20 psig) to about 0.345 MPa (gauge) (50 psig), a liquid hourly space velocity of the fresh melt feed from about 0.1 $hr^{-1}$ to about 2 $hr^{-1}$, or from about 0.2 $hr^{-1}$ to about 0.5 $hr^{-1}$. The pyrolysis process produces two product streams, a pyrolysis effluent stream 15 containing a vapor product enriched in hydrocarbon species resulting from the pyrolysis of the incoming melted plastics, and a liquid stream that is generally characterized as a residue containing unconverted polymer, inorganic metals and carbonaceous coke in a residue line 12. In an embodiment, the sorted plastics rich stream may be processed in two reactors in series, with the first reactor being a melt reactor and the second reactor being the main reactor.

Post-consumer or post-industrial polypropylene in waste plastic mix is commonly concentrated when the rigid waste plastic is concentrated at a MRF. Polypropylene is among the most used polymer at household and industrial. Many additives are used when polymer was manufactured as necessary performance enhancers, such as calcium carbonate, silicon oxides, iron oxides, aluminum oxides and titanium oxides. A variety of additive additions make waste polypropylene a difficult polymer to recycle mechanically with today's technologies. However, pyrolyzing waste polypropylene produces a variety of branched mono-olefins, such as C6, C9, C12 and C15 olefins with single double bond. Among all carbon numbers, C9 olefins, specifically, dimethylheptenes, and particularly, 2,4-dimethylheptenes, is most abundantly produced at advantageous reaction conditions. C9 olefins containing two methyl substituted heptane molecules is a precious component in reforming feedstock because it reforms to a substituted benzene product that is highly selective to xylene in contrast with a typical naphtha feed.

In addition to branched mono-olefins derived from polypropylene, waste plastic feed may also produce other olefins, paraffins, and aromatic molecules. It may contain also small residual amounts of heteroatom-containing molecules. Diolefins may exists but in trace amounts, such as less than 1000 ppmw in the total product. Generally speaking, the product stream in line 15 may be treated to remove halogens without hydrotreating, such as by adsorption or filtration.

The pyrolysis effluent stream in a pyrolysis effluent line 15 is passed to the distillation column 20 to separate a $C_9$ hydrocarbons rich stream in a $C_9$ hydrocarbons line 25. The $C_9$ hydrocarbons rich stream 25 is rich in dimethylheptenes, and specifically 2,4-dimethylheptenes. The concentration of dimethylheptenes in the pyrolysis effluent stream is between about 10 and about 35 wt %. An atmospheric distillation column may be employed to recover C10-plastic derived naphtha range molecules in an overhead line. The atmospheric distillation column may operate at a bottoms temperature of about 120° C. (248° F.) to about 300° C. (575° F.), or preferably about 140° C. (284° F.) to about 230° C. (446° F.), an overhead pressure of about 13 kPa (gauge) (2 psig) to about 130 kPa (gauge) (20 psig), or preferably about 27 kPa (gauge) (4 psig) to about 69 kPa (gauge) (10 psig). By pyrolyzing a highly concentrated polypropylene waste feed and recovering naphtha at a boiling point equivalent to C10 and lower, dimethylheptenes may be highly concentrated in distillation column overhead in line 25. In an aspect, at least 70 wt % dimethylheptenes may be recovered in the distillation overhead in line 25.

The $C_9$ hydrocarbons rich stream 25 may be treated to saturate olefinic compounds, however, is not essential to the practice of the broad aspects of this disclosure. Further in a general process design, the $C_9$ hydrocarbons rich stream 25 may also be treated without hydrotreating. However, the $C_9$ hydrocarbons rich stream 25 may be passed to a hydrotreating unit 30 before passing it to the reforming unit 40 to provide a hydrotreated $C_9$ hydrocarbons rich stream in a hydrotreated stream 35. Olefins are easily hydrogenated under typical hydrotreating conditions. Hydrotreating conditions may include a reaction temperature from 66° C. (151° F.) to about 426° C. (800° F.), or about 316° C. (600° F.) to about 418° C. (785° F.) or about 343° C. (650° F.) to about 399° C. (750° F.) and a hydrogen partial pressure from about 1.4 MPa (gauge) (200 psig) to about 8.2 MPa (gauge) (1200 psig) and a liquid hourly space velocity from about 0.25 $hr^{-1}$ to 10 $hr^{-1}$. Suitable hydrogeneration catalysts are typically comprised of at least one Group VIII metal, or iron, cobalt and nickel, or nickel and/or cobalt and at least one Group VI metal, such as molybdenum and tungsten, on a high surface area support material, such as alumina.

The hydrotreated $C_9$ hydrocarbons rich stream in line 35 is passed to the reforming unit 40 to provide a reformate stream in reformate line 45. A naphtha distillate stream in a naphtha line 5' is typically also co-fed to the reforming unit 40. The reforming unit can contain any suitable catalyst. The catalyst particles are typically comprised of one or more Group VIII (IUPAC 8-10) noble metals (e.g., platinum, iridium, rhodium, and palladium) and a halogen combined with a porous carrier, such as a refractory inorganic oxide. Although the catalyst may contain about 0.05 to about 2.0 wt % of Group VIII metal, a less expensive catalyst, such as a catalyst containing about 0.05 to about 0.5 wt % of Group VIII metal may be used. In addition, the catalyst may contain indium and/or a lanthanide series metal such as cerium. The catalyst particles may also contain one or more Group IVA (IUPAC 14) metals, such as tin, germanium, or lead. The halogen is typically chlorine, and alumina is commonly the carrier. Suitable alumina materials include, but are not limited to, gamma, eta, and theta alumina. One property related to the performance of the catalyst is the surface area of the carrier. Preferably, the carrier has a surface area of about 100 to about 500 $m^2/g$. The activity of catalysts having a surface area of less than about 130 $m^2/g$ tend to be more detrimentally affected by catalyst coke than catalysts having a higher surface area. Generally, the particles are usually spheroidal and have a diameter of about 1.6 to about 3.1 mm (about 1/16 to about 1/8 inch), although they may be as large as about 6.35 mm (about 1/4 inch) or as small as about 1.06 mm (about 1/24 inch). In a particular reforming reaction zone, however, it is desirable to use catalyst particles which fall in a relatively narrow size distribution range.

Typical feed inlet temperature for the reformers is between 440° C. (824° F.) and 580° C. (1076° F.), or between 500° C. (932° F.) and 580° C. (1076° F.), or between 540° C. (1004° F.) and 580° C. (1076° F.), or at least above 500° C. (932° F.). The reformer reactors may have different operating temperatures, for example, with a first reforming reactor having a temperature between 500° C. (932° F.) to 540° C. (1004° F.) and a second, subsequent reforming reactor having a temperature greater than 540° C. (1004° F.). The reformers can be operated at a range of pressures generally from atmospheric pressure of about 0 kPa(g) (0 psig) to about 6,895 kPa(g) (1,000 psig), or about 276 kPa(g) (40 psig) to about 1,379 kPa(g) (200 psig). The reaction conditions also include a liquid hour space velocity (LHSV) in the range from 0.6 $hr^{-1}$ to 10 $hr^{-1}$. Preferably, the LHSV is between 0.6 $hr^{-1}$ and 5 $hr^{-1}$, with a more preferred value between 1 $hr^{-1}$ and 5 $hr^{-1}$, and with a most preferred value between 2 $hr^{-1}$ and 5 $hr^{-1}$. The shorter residence time is especially preferred when utilizing the higher temperatures. The catalyst also has a residence time in the reformers of between 0.5 hours and 36 hours.

Reformate with optimized methyl-to-phenyl ratio is critical to producing a high yield of xylene in an aromatics complex that produces para, ortho and meta-xylene. $C_8$ molecules with a methyl-to-phenyl ratio of two or trimethylbenzene with a methyl-to-phenyl ratio of three, naturally lead to higher xylene yield in transalkylation. However, typical reformate derived from naphtha feed has lower methyl-to-phenyl ratio. Current ways to increase the methyl-to-phenyl ratio in reformate are typically capital intensive or are attended by another disadvantage such as requiring a dedicated pre-isomerization reactor or reducing the feed volume such as by increasing the initial boiling point of a feed to a naphtha reformer. Applicants have discovered an improved way to utilize a mixture of hydrocarbons present in a pyrolysis effluent stream obtained from pyrolysis of polypropylene-containing waste plastics while at the same time increasing the methyl-to-phenyl ratio in the feed to a xylene complex.

Applicants have discovered that pyrolysis oil derived from polypropylene-containing waste plastics contains highly branched aliphatic molecules. Further, the pyrolysis oil contains 2,4-dimethylheptenes as a predominant product. 2,4-dimethylheptenes converts to alkylated C9 aromatics, such as trimethylbenzene in a reformer. Trimethylbenzene has a methyl-to-phenyl ratio of three that boosts yield of xylene significantly in a transalkylation unit. Applicants propose mixing the pyrolysis effluent stream with a naphtha distillate stream and feeding the combined stream to the naphtha reformer to produce aromatics which are fed to a xylene complex for the production of para, ortho or meta-xylene. Applicants have discovered that by mixing the pyrolysis effluent stream with the naphtha distillate, the methyl-to-phenyl ratio of the reformate stream increases.

The reformate stream 45 is obtained from the reforming unit 40. The reformate stream comprises benzene, toluene, $C_8$ aromatics and typically contains higher aromatics. Waste plastic derived reformate increases the methyl-to-phenyl ratio of the combined reformate stream 45 over a methyl-to-phenyl ratio of a reformed naphtha distillate stream 5' that is not supplemented with the $C_9$ hydrocarbons rich stream 25 derived from plastic. A waste plastic derived reformate stream has a trimethylbenzene concentration that is higher than that of just a reformed naphtha distillate stream that is not co-fed with the $C_9$ hydrocarbons rich stream. In particular, the reformed plastic pyoil stream 25 is rich in trimethylbenzenes each with three methyl groups and one aromatic ring. Trimethylbenzenes are known as a critical reactant in transalkylation reactions with aromatic molecules with methyl-to-phenyl ratio lower than two. The reformate stream 45 is sent to the transalkylation unit 50 which contains a transalkylation catalyst to produce a transalkylated stream rich in xylenes. In the transalkylation unit 50, trimethylbenzenes are transalkylated with less desirable benzene and are converted to xylenes.

The transalkylation catalyst is a metal stabilized transalkylation catalyst. Such catalyst comprises a zeolite component, a metal component, and an inorganic oxide component The zeolite component typically is either a pentasil zeolite, which include the structures of MFI, MEL, MTW, MTT and FER (IUPAC Commission on Zeolite Nomenclature), a beta zeolite, or a mordenite. Preferably, the transalkylation catalyst is mordenite zeolite. The metal component typically is a noble metal or base metal. The noble metal is a platinum-group metal selected from platinum, palladium, rhodium, ruthenium, osmium, and iridium. The base metal is selected from the group consisting of rhenium, tin, germanium, lead, cobalt, nickel, indium, gallium, zinc, uranium, dysprosium, thallium, and mixtures thereof. The base metal may be combined with another base metal, or with a noble metal. Preferably the metal component comprises rhenium. Suitable metal amounts in the transalkylation catalyst range from about 0.01 to about 10 wt-%, with the range from about 0.1 to about 3 wt-% being preferred, and the range from about 0.1 to about 1 wt-% being highly preferred. Suitable zeolite amounts in the catalyst range from about 1 to about 99 wt-%, preferably between about 10 to about 90 wt-%, and more preferably between about 25 to about 75 wt-%. The balance of the catalyst is composed of inorganic oxide binder, preferably alumina.

Conditions employed in the transalkylation unit 50 normally include a temperature of from about 200° C. to about 540° C. The transalkylation unit 50 is operated at moderately elevated pressures broadly ranging from about 1 to about 60 kg/cm'. The transalkylation reaction can be effected over a wide range of space velocities, with higher space velocities producing higher selectivity to paraxylene at the expense of conversion. Liquid hourly space velocity generally is in the range of from about 0.1 to about 20 hr$^{-1}$. The feedstock is preferably transalkylated in the vapor phase and in the presence of hydrogen supplied via a hydrogen line 42. If transalkylated in the liquid phase, then the presence of hydrogen is optional. If present, free hydrogen is associated with the feedstock and recycled hydrocarbons in an amount of about 0.1 moles per mole of alkylaromatics up to about 10 moles per mole of alkylaromatics. This ratio of hydrogen to alkylaromatic is also referred to as hydrogen-to-hydrocarbon ratio.

The transalkylated stream may be treated or separated such as by fractionation to provide a mixed xylenes stream in a mixed xylenes line 55. The mixed xylenes stream 55 includes para-xylene, meta-xylene, ortho-xylene and ethylbenzene and may be subsequently passed to the xylene separation unit to obtain a desired $C_8$ aromatic isomer product via a separation process. Higher yields of mixed xylenes are critical to aromatics process economy. The xylene separation unit may be one of a para-xylene separation unit, a meta-xylene separation unit or an ortho-xylene separation unit depending on the $C_8$ aromatic product desired and the operating conditions can be tailored accordingly. In accordance with an exemplary embodiment as discussed, the xylene separation unit is the para-xylene separation unit 60, either by simulated moving bed adsorption or crystallization, for the purpose of the discussion of the instant embodiment. A para-xylene stream in a para-xylene line 62 and a para-xylene depleted stream in a para-xylene depleted line 65 are obtained from the para-xylene separation unit 60.

In typical aromatic complexes used to produce high purity $C_8$ aromatic isomers, the isomer-depleted raffinate stream from the separation process, either by simulated moving bed adsorption or crystallization, is sent to an isomerization process in which the remaining xylene isomers are isomerized to produce the desired isomer near equilibrium concentration. In accordance with an exemplary embodiment as discussed, the para-xylene depleted stream 65 from the para-xylene separation unit 60 is sent to the xylene isomerization unit 70 to provide an isomerized stream in a line 75. This isomerized stream 75 contains additional para-xylene which is recycled back to the para-xylene separation unit 60.

The isomerization conditions may comprise temperature ranging from about 100° C. to about 500° C., and preferably from about 200° C. to 400° C. The pressure is from about 500 kPa to about 5 MPa absolute. The isomerization unit contains a sufficient volume of catalyst to provide a liquid hourly space velocity with respect to the feed stream of from about 0.5 hr$^{-1}$ to 50 hr$^{-1}$, and preferably 0.5 hr$^{-1}$ to 20 hr$^{-1}$. The isomerization is carried out in the presence of minimal hydrogen, i.e., the amount of hydrogen present is less than about 0.2 moles/mole of feed. In accordance with an exemplary embodiment, the isomerization is carried out in the substantial absence of hydrogen and in the liquid phase with no free hydrogen being added to the feed stream; in this event, any dissolved hydrogen from prior processing is substantially less than 0.05 moles/mole of feed, frequently less than 0.01 moles/mole, and possibly not detectable by usual analytical means.

The isomerization unit 70 may comprise a single reactor or two or more separate reactors with suitable means therebetween to ensure that the desired isomerization temperature is maintained at the entrance to each reactor. The reactants may be fed to the catalyst bed in upward, downward, or radial-flow fashion.

The isomerization catalyst favorably comprises a zeolitic aluminosilicate selected from those which have a Si:Al$_2$ ratio greater than about 10, preferably greater than 20, and a pore diameter of about 5 to 8 angstroms (Å). Specific examples of suitable zeolites are the MFI, MEL. EUO, FER, MFS, MTT, MTW, TON, MOR and EAU types of zeolites. A particularly favored MFI-type zeolite is gallium-MFI, with gallium as a component of the crystal structure. A preferred Ga-MFI has a Si/Ga$_2$ mole ratio of less than 500, and preferably less than 100; the aluminum content concomitantly is very low, with an Si/Al$_2$ mole ratio of greater than 500 and preferably greater than 1000. The proportion of zeolite in the catalyst generally is in the range of from about 1 wt % to 99 wt %, and preferably from about 25 wt % to about 75 wt %. The isomerization catalyst may contain from about 0.01 wt % to 2.0 wt % of a platinum-group metal, favorably platinum, but preferably has the substantial absence of a metallic compound. An inorganic-oxide binder, preferably alumina, comprises the balance of the catalyst. A preferred catalyst shape is a sphere, with an alternative suitable shape being an extrudate.

As previously explained, the primary objective the invention is to utilize the $C_9$ containing highly branched aliphatic molecules obtained from pyrolysis of plastic waste feed and to increase the methyl-to-phenyl ratio of feed to the xylene complex. This is done by passing $C_9$ containing highly branched aliphatic molecules to the reforming unit.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

EXAMPLES

Example 1

We conducted a lab scale pyrolysis experiment. A Wisconsin MRF supplied feed was first cleansed of polyethylene terephthalate and polyvinyl chloride, and metal content by water flotation. Cleansed waste plastic was measured by an in-house $C^{13}$ NMR technique to comprise 75 wt % polypropylene balanced by other polymers, non-plastics and contaminants. The feed mixture was sent to a batch scale autoclave for pyrolysis experiment under nitrogen flow. The pyrolysis reactor was maintained for 6 hours under 420° C. and 138 kPa (20 psig). All vapor products were collected with 90% liquid yield. Among the 90% liquid yield, the following components were quantified: C6 olefins 6.94 wt %, C9 olefins 24.44 wt %, C12 olefins 6.58 wt %, C15 olefins 8.34 wt %, balanced by other olefins, paraffins and aromatics with trace heteroatom containing species. C9 olefins were further characterized by Gas Chromatography-Mass Spectrometry as predominantly 2,4-dimethylheptenes.

Example 2

We simulated a naphtha reforming unit having a 2000 KMTA throughput to illustrate the benefit for adding waste plastic derived material to the reforming unit. 200 KMTA of plastic feed was subjected to pyrolysis to yield 85 wt % pyoil and 40 wt % recovery of $C_5$-$C_{10}$ hydrocarbons, providing 80 KMTA of naphtha reforming feed from pyoil. $C_9$ olefin yield from plastic was 24 wt % based on the plastic feed rate from Example 1 and translated into a reforming yield of trimethylbenzene after stoichiometric conversion was 20% based on the plastic feed rate. Factoring in the contribution of trimethylbenzene from plastic, trimethylbenzene produced by reforming can be increased by 16 wt % relative to a reformer supplemented with no plastic feed by merely substituting petroleum naphtha with $C_5$-$C_{10}$ pyoil from pyrolyzing 200 KMTA of plastic feed equivalent to 10 wt % of the reforming unit feed rate. In theory, every 2 moles of trimethylbenzene transalkylates to 3 moles of xylene when including the conversion of otherwise net benzene from the transalkylation of a typical less than 2 methyl-to-phenyl ratio reformate produced from a petroleum naphtha. This approximates a 24 wt % increase in trimethylbenzene to xylene yield when only considering trimethylbenzene transalkylation due to the substitution of petroleum naphtha feed for $C_9$ rich pyoil feed to the reformer.

TABLE

| Case Stream | Base Feed Stream | Co-feed Conventional Naphtha Feed | Co-feed Plastic Feed |
|---|---|---|---|
| Plastic rate, KMTA | 0 | 0 | 200 |
| Pyrolysis oil yield based on plastic feed rate, wt % | 0 | 0 | 85 |
| Total $C_5$-$C_{10}$ recovery, plastic, wt % | 0 | 0 | 40 |
| Conventional Naphtha Reforming Feed, % | 100 | 96 | 0 |
| $C_5$-$C_{10}$ Pyrolysis Reforming Co-feed, % | 0 | 0 | 4 |
| Component Feed Rate, KMTA | 2000 | 1920 | 80 |
| Total Feed Rate, KMTA | 2000 | 2000 | |
| Total C9 yield ($C_9H_{18}$) plastic, wt % | | | 24 |
| Total trimethylbenzene ($C_9H_{12}$) yield from reforming feed, plastic basis, % | 10 | 10 | 20 |
| Trimethylbenzene ($C_9H_{12}$), wt % | 200 | 192 | 40 |
| Total Trimethylbenzene ($C_9H_{12}$) yield, KMTA | 200 | 232 | |
| Increase of Trimethylbenzene over Base, % | Base | 16 | |
| Increase in Xylene from Trimethylbenzenes only over Base, % | Base | 24 | |

Specific Embodiments

While the following is described in conjunction with specific embodiments, it will be understood that this description is intended to illustrate and not limit the scope of the preceding description and the appended claims.

A first embodiment of the invention is a process for converting a plastic feed to aromatics comprising heating the plastic feed in pyrolysis condition to provide a pyrolysis effluent stream; passing the pyrolysis stream into a distillation column to separate a C9 hydrocarbons rich stream; passing the C9 hydrocarbons rich stream to a reforming unit to provide a reformate stream; and passing the reformate stream to a transalkylation unit to provide a mixed-xylenes stream. An embodiment of the invention is one, any or all of prior embodiments in this paragraph up through the first embodiment in this paragraph, wherein the plastic feed contains about 40 to about 100 wt % polypropylene and the concentration of dimethylheptenes in the pyrolysis effluent stream is between about 10 and about 35 wt %. An embodiment of the invention is one, any or all of prior embodiments in this paragraph up through the first embodiment in this paragraph, wherein the C9 hydrocarbons rich stream is rich in dimethylheptenes. An embodiment of the invention is one, any or all of prior embodiments in this paragraph up through the first embodiment in this paragraph, further comprising co-feeding a naphtha distillate stream to the reforming unit. An embodiment of the invention is one, any or all of prior embodiments in this paragraph up through the first embodiment in this paragraph, wherein a methyl to phenyl ratio of the reformate stream is higher than a methyl to phenyl ratio of the reformate stream without blending plastic feed derived pyrolysis oil product. An embodiment of the invention is one, any or all of prior embodiments in this paragraph up through the first embodiment in this paragraph, wherein the reformate stream comprises a trimethylbenzene concentration that is higher than that of just a reformed naphtha distillate stream not co-fed with the $C_9$ hydrocarbons rich stream. An embodiment of the invention is one, any or all of prior embodiments in this paragraph up through the first embodiment in this paragraph, further comprising passing the C9 hydrocarbons rich stream to a hydrotreating unit before passing the C9 hydrocarbons rich stream to the reforming unit. An embodiment of the invention is one, any or all of prior embodiments in this paragraph up through the first embodiment in this paragraph, further comprising passing the mixed-xylene stream to a para-xylene separation unit to separate a para-xylene stream and provide a para-xylene depleted stream. An embodiment of the invention is one, any or all of prior embodiments in this paragraph up through the first embodiment in this paragraph, further comprising passing the para-xylene depleted stream to an isomerization unit to produce additional para-xylene.

A second embodiment of the invention is a process for converting a plastic feed to aromatics comprising heating the plastic feed under pyrolysis conditions to provide a pyrolysis effluent stream comprising between about 10 to about 35 wt % dimethylheptenes; passing the pyrolysis effluent stream into a distillation column to recover a C9 hydrocarbons rich stream; passing the C9 hydrocarbons rich to a reforming unit to provide a reformate stream; and passing the reformate stream to a transalkylation unit to provide a mixed-xylenes stream. An embodiment of the invention is one, any or all of prior embodiments in this paragraph up through the second embodiment in this paragraph, wherein the plastic feed contains about 40 to about 100 wt % polypropylene. An embodiment of the invention is one, any or all of prior embodiments in this paragraph up through the second embodiment in this paragraph, further comprising co-feeding a naphtha distillate stream to the reforming unit. An embodiment of the invention is one, any or all of prior embodiments in this paragraph up through the second embodiment in this paragraph, wherein a methyl to phenyl ratio of the reformate stream is higher than a methyl to phenyl ratio of the reformate stream without blending plastic feed derived pyrolysis oil product. An embodiment of the invention is one, any or all of prior embodiments in this paragraph up through the second embodiment in this paragraph, wherein the reformate stream comprises a trimethylbenzene concentration that is higher than that of just a reformed naphtha distillate stream not co-fed with the $C_9$ hydrocarbons rich stream. An embodiment of the invention is one, any or all of prior embodiments in this paragraph up through the second embodiment in this paragraph, further comprising passing the C9 hydrocarbons rich stream to a hydrotreating unit before passing the C9 hydrocarbons rich stream to the reforming unit. An embodiment of the invention is one, any or all of prior embodiments in this paragraph up through the second embodiment in this paragraph, further comprising passing the mixed-xylene stream to a para-xylene separation unit to separate a para-xylene stream and a para-xylene depleted stream. An embodiment of the invention is one, any or all of prior embodiments in this paragraph up through the second embodiment in this paragraph, further comprising passing the para-xylene depleted stream to an isomerization unit to produce additional para-xylene.

A third embodiment of the invention is an apparatus for converting a plastic feed to aromatics comprising a pyrolysis reactor operating under pyrolysis conditions to produce a pyrolysis effluent stream; a distillation column in communication with the pyrolysis reactor via a pyrolysis effluent line to recover a C9 hydrocarbons rich stream in a C9 hydrocarbons line; a reforming unit in communication with the distillation column via the C9 hydrocarbons line to provide a reformate stream in a reformate line; and a transalkylation unit in communication with the reforming unit via the reformate line to provide a mixed-xylenes stream in a mixed-xylenes line. An embodiment of the invention is one, any or all of prior embodiments in this paragraph up through the second embodiment in this paragraph, further comprising a naphtha distillate line in communication with the reforming unit and the naphtha distillate line in communication with a source of naphtha. An embodiment of the invention is one, any or all of prior embodiments in this paragraph up through the second embodiment in this paragraph, further comprising a para-xylene separation unit in communication with the transalkylation unit via the mixed-xylenes line to separate a para-xylene stream in a para-xylene line.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting a plastic feed comprising polypropylene to aromatics comprising:
    heating the plastic feed under pyrolysis conditions to provide a pyrolysis effluent stream;
    passing the pyrolysis effluent stream into a distillation column to separate a $C_9$ hydrocarbons rich stream;
    passing the $C_9$ hydrocarbons rich stream to a reforming unit to provide a reformate stream;
    co-feeding a petroleum naphtha distillate stream to the reforming unit; and
    passing the reformate stream to a transalkylation unit to provide a mixed-xylenes stream.

2. The process of claim 1, wherein the plastic feed contains about 40 to about 100 wt % polypropylene and the concentration of dimethylheptenes in the pyrolysis effluent stream is between about 10 and about 35 wt %.

3. The process of claim 1, wherein the $C_9$ hydrocarbons rich stream is dimethylheptenes rich.

4. The process of claim 1, wherein a methyl-to-phenyl ratio of the reformate stream is higher than a methyl-to-phenyl ratio of just a reformed naphtha distillate stream not co-fed with the $C_9$ hydrocarbons rich stream.

5. The process of claim 1, wherein the reformate stream comprises a trimethylbenzene concentration that is higher than that of just a reformed naphtha distillate stream not co-fed with the $C_9$ hydrocarbons rich stream.

6. The process of claim 1, further comprising passing the $C_9$ hydrocarbons rich stream to a hydrotreating unit before passing the $C_9$ hydrocarbons rich stream to the reforming unit.

7. The process of claim 1, further comprising passing the mixed-xylene stream to a para-xylene separation unit to separate a para-xylene stream and provide a para-xylene depleted stream.

8. The process of claim 7, further comprising passing the para-xylene depleted stream to an isomerization unit to produce additional para-xylene.

9. A process for converting a plastic feed comprising polypropylene to aromatics comprising:

heating the plastic feed under pyrolysis conditions to provide a pyrolysis effluent stream comprising between about 10 to about 35 wt % dimethylheptenes;

passing the pyrolysis effluent stream into a distillation column to recover a $C_9$ hydrocarbons rich stream;

passing the $C_9$ hydrocarbons rich to a reforming unit to provide a reformate stream;

co-feeding a petroleum naphtha distillate stream to the reforming unit; and passing the reformate stream to a transalkylation unit to provide a mixed-xylenes stream.

10. The process of claim 9, wherein the plastic feed contains about 40 to about 100 wt % polypropylene.

11. The process of claim 9, wherein a methyl to phenyl ratio of the reformate stream is higher than a methyl to phenyl ratio of just a reformed naphtha distillate stream not co-fed with the $C_9$ hydrocarbons rich stream.

12. The process of claim 9, wherein the reformate stream comprises a trimethylbenzene concentration that is higher than that of just a reformed naphtha distillate stream not co-fed with the $C_9$ hydrocarbons rich stream.

13. The process of claim 9, further comprising passing the $C_9$ hydrocarbons rich stream to a hydrotreating unit before passing the $C_9$ hydrocarbons rich stream to the reforming unit.

14. The process of claim 9, further comprising passing the mixed-xylene stream to a para-xylene separation unit to separate a para-xylene stream and a para-xylene depleted stream.

15. The process of claim 14, further comprising passing the para-xylene depleted stream to an isomerization unit to produce additional para-xylene.

* * * * *